June 12, 1928.

E. E. DRUMM

HANDLE CONSTRUCTION FOR UTENSILS

Filed Feb. 14, 1927

Inventor
Elmer E Drumm
By
Attorneys

Patented June 12, 1928.

1,673,406

UNITED STATES PATENT OFFICE.

ELMER E. DRUMM, OF MANITOWOC, WISCONSIN, ASSIGNOR TO ALUMINUM GOODS MFG. CO., OF MANITOWOC, WISCONSIN.

HANDLE CONSTRUCTION FOR UTENSILS.

Application filed February 14, 1927. Serial No. 168,032.

This invention relates to a handle construction for utensils.

In attaching the tubular handles to utensils it has been the universal practice heretofore to provide a flange on the side and bottom portions of the handle and to attach the flange to the body of the utensil, the top portion of the utensil stopping off short adjacent the body of the utensil. This has left a crack or gap between the top of the handle and the utensil and in using the utensil particles of food and greasy water find their way through this space into the tubular handle and although a drain aperture may be provided it has been found from actual experience that it is impossible to keep these handles in a sanitary condition as it is a physical impossibility to remove the accumulated material within the handle.

This invention is designed to overcome the defects noted above and objects of this invention are to provide a novel handle construction for utensils in which the tubular handle is so made and associated with the utensil that there is no gap left between the upper portion of the handle and the body of the utensil, but in which a flange is formed both on the body portion and the top portion of the handle which contacts with the body of the utensil. The upturned upper flange also contacts with the rolled bead of the utensil.

An embodiment of the invention is shown in the accompanying drawings in which.

Figure 1:
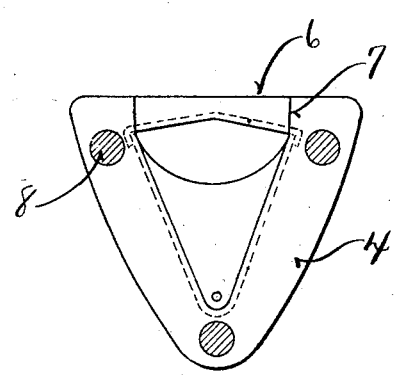
Figure 1 is a face view of the abutting end of the handle with the rivets shown in section.
Figure 2:
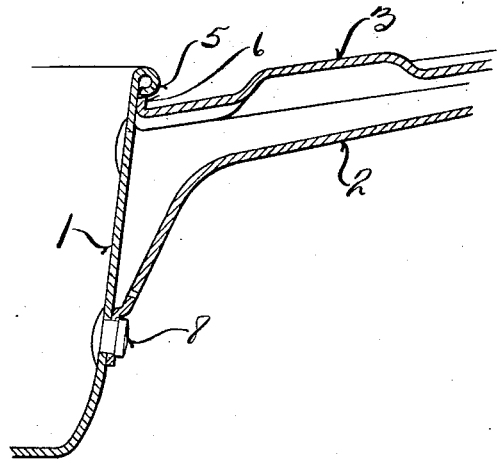
Figure 2 is a sectional view through a portion of the handle and the utensil, such view corresponding to a section on the line 2—2 of Figure 3.
Figure 3:
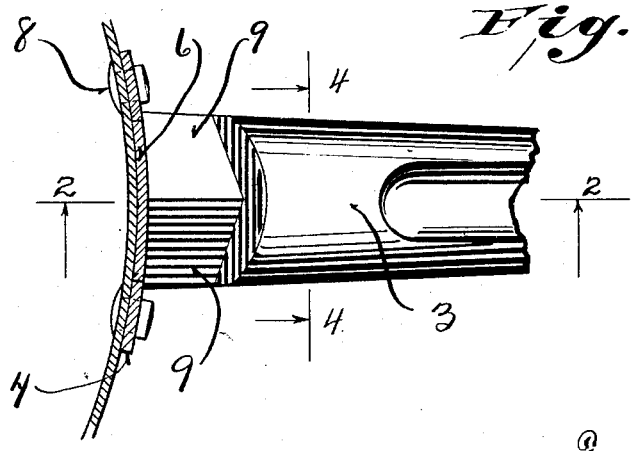
Figure 3 is a plan view of the structure shown in Figure 2 with the bead of the utensil sectioned off.
Figure 4:
Figure 4 is a sectional view on the line 4—4 of Figure 3.

Referring to the drawings, it will be seen that the utensil indicated by the reference character 1 is attached to the tubular handle whose body portion is indicated by the reference character 2 and whose top portion is indicated by the reference character 3. The body portion is provided with a flange 4, as may be seen from Figure 1, on its bottom and sides and such flange continues upwardly to a point adjacent the rolled bead 5 of the utensil, as may be seen from Figures 1 and 2. The top portion 3 is also provided with a flange 6 and this flange is upturned, as shown in Figures 1, 2, and 3. The flange 6 and the flange 4 have their edges abutting, as indicated at 7, and it is found that when the handle is tinned the joint is entirely closed.

The handle formed, as described above, is then placed in contact with the outer surface of the utensil and the flange 6 is placed in contact with the rolled bead 5 of the utensil. Thereafter, the handle is secured in place by means of the rivets 8.

It will be seen that the additional upturned flange carried by the top portion of the handle not only cooperates with the body portion of the utensil to close the gap universally found in the prior devices of this type, but also directly cooperates with the bead of the utensil and secures an additional advantage in that the bead itself aids in closing the gap.

Further, in order to prevent water from collecting on the handle in the space adjacent the utensil, the portions 9 thereof, as may be seen from Figure 3, are bevelled downwardly in opposite directions so as to shed the water from the handle. Ordinarily, the handle is depressed at this point by means of an offset portion extending straight across the handle. However, this invention contemplates slanting this portion in opposite directions, as stated, and thus prevents collecting of water in this part of the handle.

It will be seen that a novel type of handle construction has been provided for utensils which is so made that there is no gap between the upper portion of the tubular handle and the utensil, but that this portion of the handle is upwardly flanged and such flange contacts not only with the body portion but also with the bead of the utensil.

Although the invention has been described in considerable detail, such description is intended as illustrative rather than limiting as the invention may be variously embodied and as the scope of such invention is to be determined as claimed.

I claim:

1. The combination of a utensil having a body portion provided with a beaded marginal edge, and a tubular handle having a body portion and a top, said body portion of the handle having an outwardly extending flange secured to the body of the utensil, and said top portion of the handle having an upturned flange contacting with the body portion of the utensil and abutting the lower edge of the marginal bead.

2. The combination of a utensil having a body portion provided with a marginal bead, a tubular handle having an outwardly turned marginal flange extending completely around the end of the handle adjacent the utensil and contacting with the body of the utensil, said flange having an upper edge positioned below and abutting the lower edge of the bead of the utensil, whereby no gap is formed between the inner end of the handle and the utensil.

3. The combination of a utensil having a body portion and a marginal bead, a tubular handle having a body portion and a top portion, said body portion of said handle having an outwardly turned flange secured to the body portion of said utensil and the top portion of said handle having an upwardly turned flange contacting with the body portion and the underside of said bead, said flanges having abutting edges.

4. The combination of a utensil having a body portion provided with a marginal bead, a tubular handle having a body portion and a top portion, the body portion of said handle having an outwardly turned flange secured to the body portion of said utensil and having an upturned flange contacting with the body portion of the utensil and with said bead, said handle having a depressed part formed in its upper portion adjacent said flange, such depressed portion having outwardly and downwardly slanting surfaces extending from the central part of the depressed portion to the edges of the handle.

In testimony that I claim the foregoing I have hereunto set my hand at Manitowoc in the county of Manitowoc and State of Wisconsin.

ELMER E. DRUMM.